United States Patent [19]
Durand et al.

[11] Patent Number: 5,687,522
[45] Date of Patent: Nov. 18, 1997

[54] FORMWORK FOR BUILDING A CONCRETE WALL

[76] Inventors: Philippe Durand, 3, alleé de la Rive, F-78740 Vaux-sur-Seine; Françoise Dauron, 51, rue Haute, F-78250 Meulan, both of France

[21] Appl. No.: 351,347

[22] PCT Filed: Jun. 9, 1993

[86] PCT No.: PCT/FR93/00548

§ 371 Date: Dec. 9, 1994

§ 102(e) Date: Dec. 9, 1994

[87] PCT Pub. No.: WO93/25776

PCT Pub. Date: Dec. 23, 1993

[30] Foreign Application Priority Data

Jun. 11, 1992 [FR] France .................................. 92 07042

[51] Int. Cl.$^6$ .............................. E04G 11/06; E04B 2/54
[52] U.S. Cl. .................. 52/414; 52/378; 52/426; 52/439; 52/745.09; 249/18; 249/78; 249/113; 249/141; 264/35; 264/277; 264/404
[58] Field of Search .................. 52/251, 258, 351, 52/378, 414, 422, 425, 426, 439, 581, 745.05, 745.09; 249/18, 78, 113, 141; 264/35, 43, 277, 333, 402, 404

[56] References Cited

U.S. PATENT DOCUMENTS

| Re. 29,945 | 3/1979 | Scott | 249/78 X |
| 951,031 | 3/1910 | Sobel | 52/378 X |
| 2,175,895 | 10/1939 | Hybinette | 249/18 X |
| 2,496,616 | 2/1950 | Barton | 52/378 X |
| 3,376,681 | 4/1968 | Demaison | 52/426 X |
| 3,559,355 | 2/1971 | Day, Jr. | 52/378 X |
| 5,078,940 | 1/1992 | Sayles | 264/333 X |

FOREIGN PATENT DOCUMENTS 2652001  5/1978  Germany ...................... 52/378

*Primary Examiner*—Carl D. Friedman
*Assistant Examiner*—Kevin D. Wilkens
*Attorney, Agent, or Firm*—Speckman, Pauley & Fejer

[57] ABSTRACT

A formwork constructed of prefabricated elements, preferably for building a concrete wall. The formwork has two parallel walls that define a space that is filled with concrete laden with water, sand and large aggregates. An inner wall of the formwork has a lattice or perforated structure to filter and pass water and small aggregates from the space that is filled with concrete. An outer wall also has a lattice or perforated structure to filter additional water and smaller aggregates from the space that is filled with concrete. This invention also includes a concrete heating wall that may be constructed from formwork.

20 Claims, 2 Drawing Sheets

FORMWORK FOR BUILDING A CONCRETE WALL

BACKGROUND OF THE INVENTION

1. Field of the Invention

This invention relates to a formwork constructed of prefabricated elements, intended for building a concrete wall. The formwork includes two parallel walls that define a space that is filled with concrete laden with sand and large aggregates. This invention also includes a concrete wall, and in particular a heating wall, built by the formwork.

2. Description of Prior Art

Concrete includes a mixture of cement, sand, large stone aggregates of variable sizes, such as gravel, and water. This mixture is heterogeneous, and each of its constituents, except for the mixture of water and cement, is independent. The workability of concrete, that is, the ability of concrete to perfectly fill a formwork, depends on the ease with which each of the constituents of the concrete mixture can become free of the frictional forces that neighboring constituents exert. In order to promote this workability, the concept has arisen of adding a major proportion of water, which is called water of mobility. This excess water makes it possible to put all the constituents of the concrete mixture in suspension and to maintain a lubricating film between them.

The water of mobility, which is indispensible for pouring fluidic concrete, is nevertheless deleterious for the characteristics of the concrete.

In practical terms, the concrete mixture contains an excess of water, due to the water of mobility that is not combined with the cement. For example, in a concrete mixture having 350 kg/m$^2$ of cement, where the requisite quantity of water is 90 l, a mixture with 205 l of water is generally made. In a closed formwork, the excess water partly evaporates at the surface, and the remainder of the excess water continues to be present in the concrete in a free state, in the form of fine particles, which migrate from one void to another through miniscule channels as a function of the stress of working of the concrete (from the compressed zone to the stretched zone—the hysteresis phenomenon in concrete).

The presence of the free water, whose state is a function of the temperature of the concrete composition:

1) subjects the concrete to parasitic tensions when the temperature is less than 0° C. or greater than 100° C.;
2) generates shrinkage cracking phenomena;
3) can cause corrosion to steel, resulting in a drop in load bearing capability; and
4) reduces the mechanical strength of the concrete.

Thus it is desirable to preserve the water of mobility during the pouring phase, but to eliminate the water of mobility as soon as possible thereafter, and preferably before the concrete cures.

From French Patent Reference FR A 787 657, a formwork is known that includes a fine metal sheet that assures a filtration of the water. The filter sheet is stretched over a grid of expanded metal, and acts as a drain, which presses against an outer formwork plate, in which openings have been formed for the evacuation of the water. It is understood that such formwork is of the recoverable type; the various filtration elements that are pressed against the outer wall make the formwork inappropriate, because of its cost and structure, for an application as a sacrificial formwork.

From British Patent Reference GB-A 2 180 877, a formwork is known that includes a wall which assures the filtration of the excess water. The wall can be made of various materials, such as veneer, plastic, woven materials, for example. The rigidity of the wall when the concrete is poured is assured by a panel against which the filtering wall presses directly, with passages formed in the panel for the evacuation of the water.

These filtration techniques have various disadvantages. First, they require a relatively cumbersome support structure because the filtering wall is not self-supporting and must press against an outer wall that has evacuation openings. Second, assuming the formwork is partially sacrificial, or in other words that the filtering wall need not be recovered after the formwork is removed, but is intended to be part of the body of the concrete wall after the concrete has set, as may be the case if it is made of an insulating material (see British Patent Reference GB-A 2 180 877), the filtering wall necessarily forms an outer lining. The filtering wall cannot be embedded in the concrete, because of the formwork panel located immediately behind it. Finally, conventional formworks that include a filtration wall intend to evacuate the excess water, but cannot improve the quality of the concrete by skillful distribution of the other constituents of the concrete mixture.

It is known that the characteristics of concrete are not linked solely to the proper quantity of water but also to the ratio of gravel to sand; thus the higher the gravel to sand ratio, the more the mechanical characteristics of the concrete are improved. Nevertheless, voids between pieces of gravel must be filled with fine elements such as sand and cement, which act as a film among the aggregates, making their relatively homogeneous distribution in the mass of the concrete easier and welding them to one another.

In practice, the gravel pieces are of variable size, and to assure cohesion among the aggregates, the quantity of sand is increased. However, increasing the quantity of sand can be detrimental to the mechanical characteristics of the concrete, as noted above.

SUMMARY OF THE INVENTION

It is one object of this invention to create a sacrificial formwork, making it possible to construct a wall from an optimal concrete, without excess water and having the proper proportion of fine elements of sand and cement in proportion to large aggregates, with such a wall having improved resistance to vertical compressive forces compared with walls constructed with known formworks.

According to one preferred embodiment of this invention, the formwork is constructed of prefabricated elements, and is intended for building a concrete wall. The formwork can include two parallel walls that between them define a space that will accept concrete which is laden with sand and large aggregates.

According to one preferred embodiment of this invention, the formwork is a sacrificial formwork, and at least one of the walls is a self-supporting wall constructed of a plate perforated over its entire surface with openings slightly smaller than the size of the smallest of the large aggregates.

The openings preferably retain the large aggregates while allowing the excess water and a small portion of fine elements, such as the sand and cement, to pass through. Inside the formwork walls remain the aggregates and sufficient mortar to fill voids between the aggregates.

Because the formwork is a sacrificial formwork and the perforated wall is self-supporting, in contrast to the known prior art which requires a supporting wall, according to the formwork of this invention the excess water and mortar pass through the openings, sheathing the outer surface of the perforated wall. This sheathing is desirable since the perforated plate is a metal plate, which is thereby protected against corrosion by the sheathing. Further, if a lining has been provided, for example an insulating material, then the mortar which penetrates the openings of the perforated plate assures the bond between the concrete shell and the lining and bonds the lining to its entire surface, thus improving its sound absorption coefficient.

According to a preferred embodiment of this invention, if the wall to be erected is a load-bearing wall that must have a certain thickness, at least one inner wall is positioned parallel to and between the two formwork walls, and nearer the perforated formwork wall. The inner wall can also be a plate perforated over its entire surface and have openings of a size such that the excess aggregates of the concrete having the smallest sizes can pass through the inner wall and enter the space between the inner wall and the formwork wall closest to the inner wall.

The inner wall of the formwork thus can act as a filter that separates large-sized aggregates from small-sized aggregates. After the concrete is poured, the volume of concrete between the inner wall and the wall closest to the inner wall has a much larger proportion of small-sized aggregates than the volume of concrete between the inner wall and the wall farther away from the inner wall, which constitutes the larger portion of the concrete wall.

Thus, the larger portion of the concrete wall contains large-sized aggregates that are quite close to one another, along with small-sized aggregates and mortar that fills the spaces between the various aggregates.

Further, the exterior wall closer to the inner wall is also perforated, as is the inner wall, and acts as a complementary filter, which evacuates the excess water and fine elements and retains only the small aggregates and just enough mortar to fill the voids between the aggregates, as explained above.

Additionally, a granulometric distribution that favors the evacuation of the water of mobility is achieved.

These three points combined contribute to improving the mechanical resistance of the concrete wall.

In addition, the forces associated with the curing of the concrete are exerted on the formwork and put the components of the formwork under tension. This tension decreases with the progress of the evacuation of the excess material, and remains at a residual value after the cement has set.

Thus, the formwork locks the concrete and bands the concrete shells, and thus increases the mechanical characteristics of the shell.

According to one preferred embodiment of this invention, the perforated plates are plates of expanded metal reinforced by reinforcements.

In addition to the filter function of the perforated plates, the perforated plates, or latticework, which may be constructed of expanded metal or welded wire, decreases the weight of the formwork and acts as an armature for the concrete, particularly in one preferred embodiment that includes an inner perforated wall. The inner perforated wall can be embedded in the concrete shell, and thus replaces the armoring which must conventionally be introduced into a formwork requiring additional strength, before the concrete is poured.

The reinforcements of the perforated plates assure the rigidity of the expanded metal plates, particularly the perforated plate that serves as an outer wall of the framework, which is made self-supporting so as to resist the pressure of the concrete as it is poured, without requiring an additional supporting wall which would impede the sheathing of the metal plate by the concrete, which protects the plate from corrosion.

The reinforcements, when properly arranged, lend themselves to multiple applications as described in the Applicant's French Patent No. 2 675 181. In particular, if the reinforcements are positioned on an outer face of the formwork walls, they can support a lining of an external or internal type and can form an air pocket that is indispensible to such a lining.

The reinforcements can also be part of a solar energy recovery system. The reinforcements and the lining that they support define voids and the reinforcements perform the function of air circulation channels.

According to one preferred embodiment of this invention, the reinforcements of one wall are oriented perpendicular to a direction of the reinforcements of another wall, thus increasing the resistance of the formwork to the pressure of the poured concrete.

According to another preferred embodiment of this invention, the parallel walls of the sacrificial formwork are connected to one another by braces. Each end of the brace is positioned on a wall in such a way as to enable storage of the formwork in a folded position, allowing the walls to be placed against each other.

The articulated braces can connect two outer formwork walls, if the formwork includes no inner wall, and one inner wall to one and/or the other outer wall if the formwork includes successive filtering walls spaced apart from one another, according to one preferred embodiment of this invention.

The ability to fold the walls against one another is advantageous for storage and transporting the formwork.

The connection between the braces and the walls makes it possible to obtain a three-dimensional formwork structure that is preassembled so that the formwork can be put in place at the construction site. Further, in combination with the reinforcements made of expanded metal plates, the braces contribute to the stability of the formwork structure, such that the formwork walls are self-supporting and can accordingly play a filtration role without the need for undesirable supporting walls. Such supporting walls make the formwork more difficult to employ and impede the sheathing of the perforated plate.

When the formwork structure is constructed, the braces can be mounted in a fast and systematic way between two formwork walls, using the connection mode described in Applicant's French Patent 2 675 181.

According to another preferred embodiment of this invention, the formwork can be employed to build a heating concrete wall. The formwork walls can be constructed of metal, and two parallel walls can be connected by conductors to a low-voltage current generator. The two walls can be spaced apart from one another by braces of electrically insulating material, and electrical resistors can be positioned between the two walls and electrically coupled to the two walls.

Thus, two metal walls, at least one of which is perforated and acts as a filter, also serve as electrical conductors that carry a current to the terminals of electrical resistors positioned between the two walls. The two electrical resistors thus heat the portion of the concrete wall between the two walls, preferably adjacent to the inside of a residential building, which heats the interior of the building in an ideal way in terms of comfort, particularly by using radiation.

In addition, the remainder of the concrete wall serves by conduction to conserve heat, which can be restored to the habitable space, the energy having advantageously been stored during the off-peak hours.

BRIEF DESCRIPTION OF THE DRAWINGS

Other features and advantages of this invention will become more apparent from the ensuing description, taken in conjunction with the drawings, wherein.

DESCRIPTION OF PREFERRED EMBODIMENTS

Figure 1:
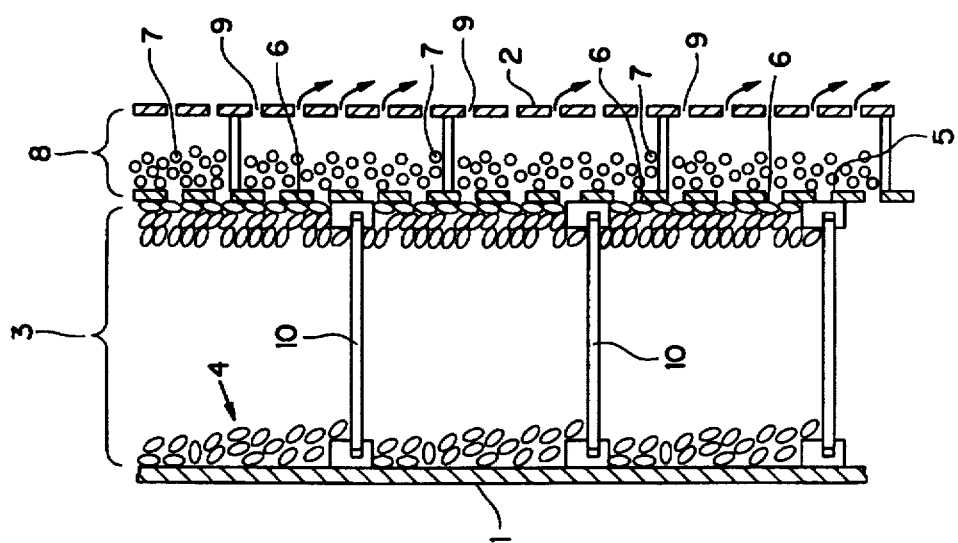
FIG. 1 is a partial cross-sectional view of a formwork according to one preferred embodiment of this invention, filled with concrete.

In one preferred embodiment according to this invention, as shown in FIG. 1, a formwork intended for building a concrete wall includes two parallel walls 1, 2 that define a space 3 intended to be filled with concrete 4. The wall 1 may carry a heat-insulating lining, preferably water-permeable, for insulating the concrete wall on the exterior. The wall 2 is permeable and allows the excess laitence, that is, the water and the fine elements such as cement and sand, to pass through.

Between the two walls 1, 2, at a distance from each of the walls 1, 2 but preferably closer to the wall 2, at least one inner wall 5 extends parallel to the other two walls 1, 2. The inner wall 5 has openings 6. The openings 6 preferably allow the smaller excess aggregates 7 of the concrete 4 to pass through the inner wall 5, when the concrete 4 is poured into the space 3, and penetrate a space 8 between the wall 5 and the wall 2.

According to one preferred embodiment of this invention, the walls 2, 5 comprise perforated metal plates, and can be made of steel, for example.

Figure 3:
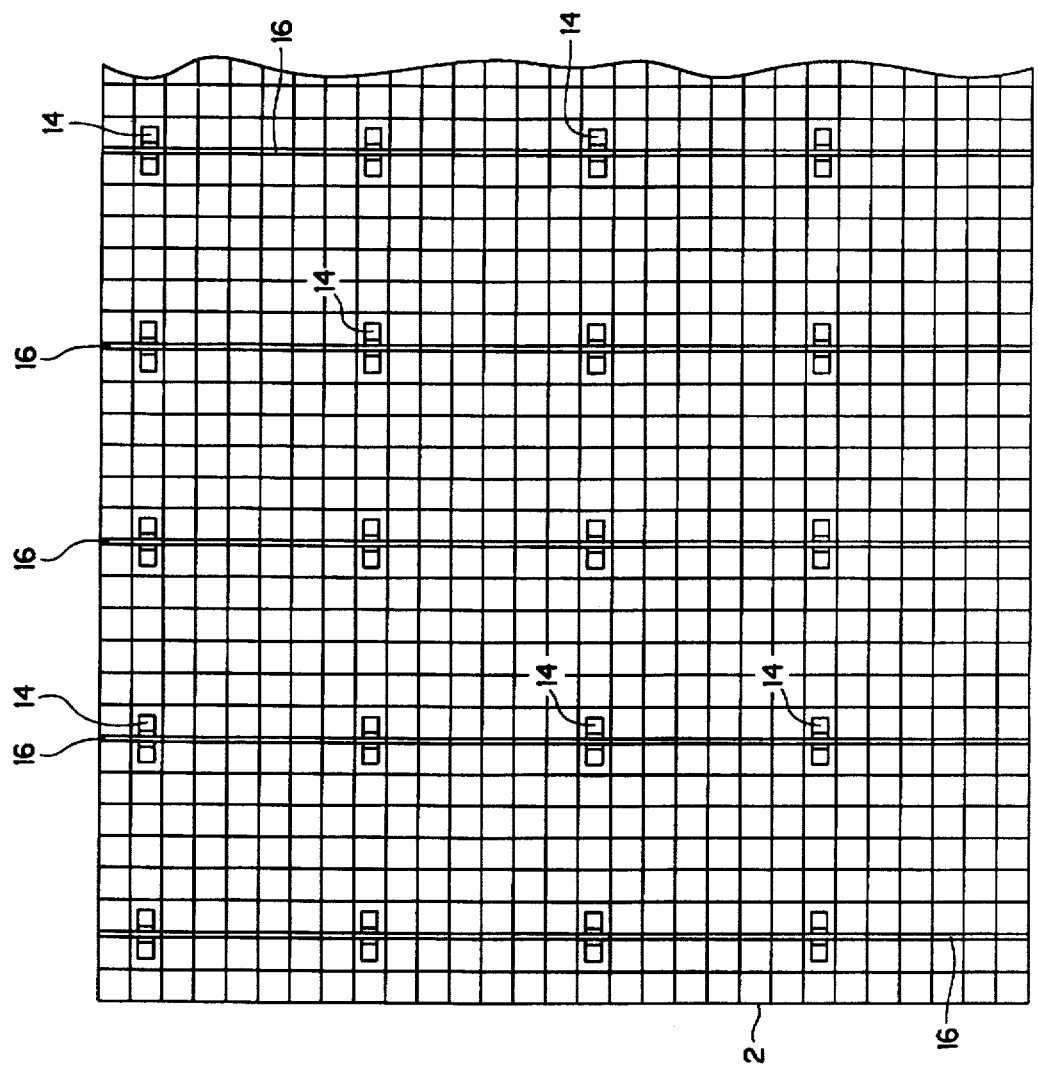
FIG. 3 is a plan view on a smaller scale of the formwork seen in the direction of the arrow F of FIG. 2.
Figure 2:
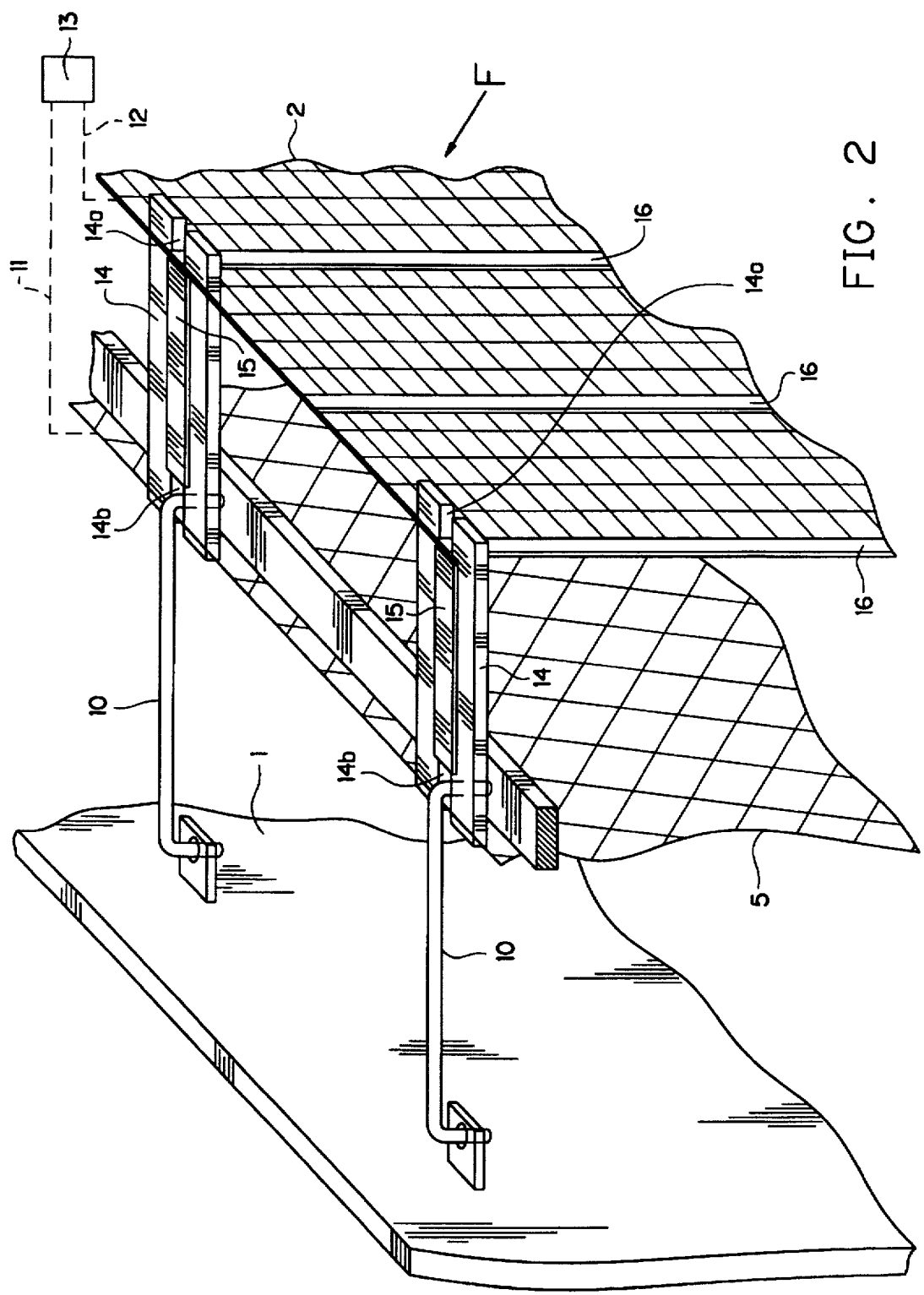
FIG. 2 is a perspective view of a portion of a framework according to another preferred embodiment of this invention.

The perforated metal plates are preferably of expanded metal, for example of the Nerlat type, and are reinforced with reinforcements 16 as shown in FIGS. 2 and 3. The reinforcements 16 are preferably ribs of expanded metal made at the time the expanded metal is manufactured, or are hollow metal profiles attached to the expanded metal.

The size of the openings 9 of the wall 2 is preferably between 5 and 7 mm.

The size of the openings 6 of the inner wall 5 is preferably between 15 and 25 mm.

According to one preferred embodiment of this invention, the distance between the inner wall 5 and the wall 2 is at least equivalent to a minimum sheathing distance, that is, 25 mm, and preferably is between 30 and 40 mm in the case of a load-bearing concrete wall of typical thickness.

As shown in FIG. 1, the inner wall 5 is joined to the wall 1 by removable braces 10, according to one preferred embodiment of this invention.

The braces 10 are preferably joined in articulated fashion to the walls 5, 1, which makes it possible to reduce the bulk of the formwork during storage and transport and facilitates assembly of the formwork.

The formwork according to one preferred embodiment of this invention is advantageously applicable to building a heating concrete wall.

As can be seen in FIG. 2, the inner wall 5 and the wall 2 are connected by conductors 11, 12 to a low voltage current generator 13. The two walls 5, 2 are maintained at a distance from one another by braces 14 which comprise an electrically insulating material. Electrical resistors or thermistors 15 are positioned between the two walls 5, 2 and are electrically coupled to the two walls 5, 2.

Preferably, the two walls 5, 2 are connected to a current generator 13 that generates a direct voltage of less than 50 V. The wall 2, which is preferably adjacent to the interior of the residential building, is preferably at zero potential.

According to another preferred embodiment of this invention, the formwork includes only two outer formwork walls 1, 2, without an inner wall 5. The two outer walls 1, 2 can be connected to a selected potential, of 24 V, for example, and the resulting concrete wall can form a partition between two rooms. The outer wall that is not at zero potential is covered with an electrically insulating lining, which can be supported by the reinforcements.

As shown in FIG. 2, the electrical resistors 15 are preferably supported by the insulating braces 14. The resistors 15 preferably comprise thermistors, which enable self-regulation of the heating power.

As shown in FIG. 3, the formwork includes a large number of insulating braces 14, distributed at regular intervals and each insulating brace 14 carrying one low-power electrical resistor. A heating power on the order of 100 W/m$^2$ is sufficient to heat a room.

According to one preferred embodiment of this invention, as shown in FIG. 2, the braces 14 comprise plastic and include notches 14a, 14b at end portions of the brace 14. The notches 14a make it possible to fix the braces 14 with respect to the reinforcements 16 of the wall 2. The notches 14b preferably engage the wall 5 and enable an articulated fixation of the braces 10 that are removably secured to the wall 1 and the wall 5.

The wall 1 also may be made of expanded metal.

The process of building a concrete wall using the formwork that has just been described will now be explained.

The formwork is first positioned vertically, as shown in FIG. 1. This operation is facilitated by the lightness of the formwork and by the presence of the braces 10 articulated to the walls 1 and 5, which contribute to making the walls 1, 5 self-supporting.

Maintaining the walls 1, 5 in position at the intended location is achieved by vertical props, not shown.

The concrete 4, which has a conventional composition of cement, sand and aggregates of various sizes, and sufficient fluidity, is poured into the space 3 between the walls 1 and 5.

During the pouring of the concrete 4, the walls 5 and 2 act as filters. The wall 5 retains the large-sized aggregates in the space 3, along with the majority of the mortar and the small-sized aggregates intended for purposes of filling among the large aggregates. The excess, composed of small-sized aggregates and mortar, passes through the perforations in wall 5 and enters the space 8 between the walls 5 and 2. The small aggregates and the mortar intended for filling between the small aggregates remain in the space 8, and only the water and excess mortar pass through the perforations in wall 2 and are evacuated to the exterior of the formwork.

Because of this successive filtration, the fine elements are evacuated, which improves the ratio of gravel to sand. The evacuation of the excess water causes the concrete 4 to change from a state of a Newtonian fluid to that of a Brownian (semi-solid) fluid, and the forces developed during the pouring are considerably diminished and enable the formwork to withstand very great pouring heights of more than 6 meters.

The concrete 4 in the formwork thus approaches the optimum composition, which provides the concrete wall with improved resistance to compressive forces.

Additionally, the perforated wall 5, embedded in concrete 4, acts as a metal armature, which can thus at least partly replace the armoring.

The perforated wall 2, sheathed with concrete 4 on an outer surface of the wall 2, is thus protected against corrosion.

The metal walls 5 and 2 are a convenient way to support insulating braces 14. The metal walls 5 and 2 also can supply electricity to the heating resistors 15 that are supported by the insulating braces 14.

Thus, a heating concrete wall capable of radiantly heating an interior of a residential building under optimal comfort conditions can be achieved in an economical way.

The formwork according to this invention has multiple advantages, including being a lightweight preassembled structure, being practical to store and transport, being ready for use, and enabling the making of a concrete shell that has excellent properties of mechanical strength and is capable of acting as a heating concrete wall.

It is understood that this invention is not limited to the preferred embodiments that have been described above, and that numerous modifications may be made without departing from the scope of this invention.

According to one preferred embodiment of this invention, the formwork may include only two outer walls, only one of them being perforated to assure the filtration of the excess water and mortar.

According to another preferred embodiment of this invention, the formwork may include a third filtering or even an $n^{th}$ filtering wall, depending on the thickness of the concrete wall to be made, in such a way as to obtain a calibrated distribution of increasingly fine aggregates toward the outer surface of the shell.

We claim:

1. In a sacrificial formwork for building a concrete wall, the formwork having a first outer wall (1) and a second outer wall (2), the improvement comprising:

the first outer wall (1) positioned generally parallel to and at a distance from the second outer wall (2), the second outer wall (2) having a plurality of first openings (9), at least one inner filtering wall (5) positioned generally parallel to and between the first outer wall (1) and the second outer wall (2) and forming a first space (3) between the first outer wall (1) and the at least one inner filtering wall (5) and a second space (8) between the second outer wall (2) and the at least one inner filtering wall (5), the at least one inner filtering wall (5) having a plurality of second openings (6), a first diameter of each of the first openings (9) being less than a second diameter of each of the second openings (6), such that when fluidic concrete is poured within the first space (3) aggregates of the fluidic concrete of a size smaller than the second diameter are allowed to pass from the first space (3) through the second openings (6) to the second space (8).

2. In a sacrificial formwork according to claim 1, wherein each of the first openings (9) has a general diameter between about 5 mm and about 7 mm.

3. In a sacrificial formwork according to claim 1, wherein each of the second openings (6) has a general diameter between about 15 mm and about 25 mm.

4. In a sacrificial formwork according to claim 1, wherein the second outer wall (2) and the at least one inner filtering wall (5) each comprise a plate of reinforced expanded metal.

5. In a sacrificial formwork according to claim 1, wherein the first outer wall (1) and the at least one inner filtering wall (5) are connected with respect to one another by a plurality of braces (10), and each of the braces (10) are articulated on each of two ends of each brace (10) whereby the formwork can be folded.

6. In a sacrificial formwork according to claim 1, wherein the at least one inner filtering wall (5) and the second outer wall (2) are connected with respect to one another by at least two conductors (11, 12) to a low-voltage current generator (13), the at least one inner filtering wall (5) and the second outer wall (2) are positioned at a distance from one another by a plurality of insulating braces (14), and a plurality of electrical resistors (15) are positioned between and electrically coupled to the at least one inner filtering wall (5) and the second outer wall (2).

7. In a sacrificial formwork according to claim 1 wherein the second outer wall is self-supporting and thereby resists a pressure of the fluidic concrete when poured into the first space (3) and the second space (8).

8. In a sacrificial formwork according to claim 1, wherein a distance between the at least one inner filtering wall (5) and the second outer wall (2) which is closest to the at least one inner wall (5) is greater than about 25 mm.

9. In a sacrificial formwork according to claim 8, wherein the second outer wall (2) and the at least one inner filtering wall (5) each comprise a plate of reinforced expanded metal.

10. In a sacrificial formwork according to claim 9, wherein the first outer wall (1) and the at least one inner filtering wall (5) are connected with respect to one another by a plurality of braces (10), each of the braces (10) articulated on each of two ends of each brace (10) whereby the formwork can be folded.

11. In a sacrificial formwork according to claim 10, wherein the at least one inner filtering wall (5) and the second outer wall (2) are connected with respect to one another by at least two conductors (11, 12) to a low-voltage current generator (13), the at least one inner filtering wall (5) and the second outer wall (2) are positioned at a distance from one another by a plurality of insulating braces (14), and a plurality of electrical resistors (15) are positioned between and electrically coupled to the at least one inner filtering wall (5) and the second outer wall (2).

12. In a sacrificial formwork according to claim 11, wherein the at least one inner filtering wall (5) and the second outer wall (2) are connected to a generator that generates voltage of less than about 50 V.

13. In a sacrificial formwork according to claim 12, wherein each of the electrical resistors (15) is supported by at least one of said insulating braces (14).

14. In a sacrificial formwork according to claim 13, wherein each of the resistors (15) comprises a thermistor.

15. In a sacrificial formwork according to claim 14, wherein the plurality of electrical resistors (15) are of low power, each resistor (15) is positioned at a generally equivalent distance from an adjacent resistor (15), and the cumulative heating power of the resistors (15) is about 100 W/m$^2$.

16. In a sacrificial formwork according to claim 11, wherein each of the electrical resistors (15) is supported by at least one of said insulating braces (14).

17. In a sacrificial formwork according to claim 11, wherein each of the resistors (15) comprises a thermistor.

18. In a sacrificial formwork according to claim 11, wherein the plurality of electrical resistors (15) are of low power, each resistor (15) is positioned at a generally equivalent distance from an adjacent resistor (15), and the cumulative heating power of the resistors (15) is about 100 W/m$^2$.

19. In a method for building a concrete wall with a sacrificial formwork, wherein the sacrificial formwork has a first outer wall (1) and a second outer wall (2), the improvement comprising:

positioning the first outer wall (1) generally parallel to and at a distance from the second outer wall (2) which has a plurality of first openings (9) each with a first diameter;

positioning at least one inner filtering wall (5) which has a plurality of second openings (6), each with a second diameter greater than the first diameter, generally parallel to and between the first outer wall (1) and the second outer wall (2) and forming a first space (3) between the first outer wall (1) and the at least one inner filtering wall (5) and a second space (8) between the second outer wall (2) and the at least one inner filtering wall (5); and pouring fluidic concrete into the first space (3), wherein concrete aggregates of a size smaller than the second diameter pass from the first space (3) through the second openings (6) to the second space (8).

20. In a method according to claim 19, further comprising:

electrically coupling a voltage generator to the at least one inner filtering wall (5) and the second outer wall (2); and electrically coupling an end of a heating resistor to the at least one inner filtering wall (5) and electrically coupling another end of the heating resistor to the second outer wall (2).

* * * * *